United States Patent
Hornby

(10) Patent No.: US 7,621,469 B2
(45) Date of Patent: Nov. 24, 2009

(54) AUTOMOTIVE MODULAR LPG INJECTOR

(75) Inventor: Michael J. Hornby, Williamsburg, VA (US)

(73) Assignee: Continental Automotive Canada, Inc., Chatham, Ontario (CA)

( * ) Notice: Subject to any disclaimer, the term of this patent is extended or adjusted under 35 U.S.C. 154(b) by 112 days.

(21) Appl. No.: 11/986,951

(22) Filed: Nov. 27, 2007

(65) Prior Publication Data

US 2008/0135020 A1     Jun. 12, 2008

Related U.S. Application Data

(60) Provisional application No. 60/867,647, filed on Nov. 29, 2006.

(51) Int. Cl.
*B05B 1/00* (2006.01)
*F02M 51/00* (2006.01)

(52) U.S. Cl. .................. 239/600; 239/585.1; 239/8; 239/5; 239/533.2; 123/478; 123/457; 123/452

(58) Field of Classification Search ............. 239/5, 239/584, 585.1–585.5, 533.2, 533.29, 533.11
See application file for complete search history.

(56) References Cited

U.S. PATENT DOCUMENTS

| | | | | | |
|---|---|---|---|---|---|
| 6,003,790 | A | * | 12/1999 | Fly | 239/533.9 |
| 6,012,655 | A | * | 1/2000 | Maier | 239/585.4 |
| 6,024,293 | A | * | 2/2000 | Hall | 239/5 |
| 6,047,907 | A | * | 4/2000 | Hornby | 239/585.1 |
| 6,089,475 | A | * | 7/2000 | Reiter et al. | 239/585.1 |
| 6,201,461 | B1 | * | 3/2001 | Eichendorf et al. | 335/256 |
| 6,328,232 | B1 | * | 12/2001 | Haltiner et al. | 239/585.1 |
| 6,676,044 | B2 | * | 1/2004 | Dallmeyer et al. | 239/585.1 |
| 7,090,152 | B2 | * | 8/2006 | Kobayashi et al. | 239/533.2 |
| 7,306,168 | B2 | * | 12/2007 | Hornby | 239/88 |
| 7,347,383 | B2 | * | 3/2008 | Dallmeyer et al. | 239/5 |
| 7,422,160 | B2 | * | 9/2008 | Dallmeyer | 239/5 |
| 2001/0010337 | A1 | * | 8/2001 | Kummer | 239/5 |
| 2007/0044774 | A1 | * | 3/2007 | Kim | 123/527 |

* cited by examiner

*Primary Examiner*—Len Tran
*Assistant Examiner*—James S Hogan

(57) ABSTRACT

A fuel injector for use with LPG or other volatile fuels has fuel inlets through a cylindrical wall of a valve group tube assembly. Fuel venting is along a longitudinal axis of the fuel injector to an end opposite the injection end. An O-ring retaining cup is welded to the tube assembly above and below the fuel inlets to seal these members and to maintain alignment of holes in the cup with the fuel inlets.

19 Claims, 7 Drawing Sheets

AUTOMOTIVE MODULAR LPG INJECTOR

CROSS REFERENCE TO RELATED APPLICATIONS

This application claims the benefit of U.S. Provisional Application Ser. No.: 60/867,647 filed on Nov. 29, 2006, the contents of which are hereby incorporated by reference herein in their entirety.

FIELD OF THE INVENTION

The present invention relates generally to the field of fuel delivery systems, and more particularly to apparatus, methods and systems for a modular constructed fuel injector supplying LPG (Liquid Petroleum Gas) to an internal combustion engine.

BACKGROUND OF THE INVENTION

The marketplace for internal combustion engines continues to move toward "alternative" fuels such as E15, E85, Ethanol and ultra-low sulfur gasoline, "greener" engines having lower fuel consumption, lower emissions and specifying composition of exhaust stream, and "greener" fuels (specifying composition of fuels, (i.e. low sulfur), composition of exhaust stream, . . . ). As such, Liquefied Petroleum Gas (LPG), which has been used for decades as a fuel source for fork lifts and some truck applications, is becoming a more widely used fuel for internal combustion, particularly for automotive internal combustion applications.

Automotive manufactures are keenly aware of performance, cost and reliability considerations relating to components or systems which may enter widespread field service and have an expected service life of years to decades. Fuel injectors for gasoline automotive applications have been in widespread deployment for about 20 years while widespread deployment of LPG fuel injector could be just over the horizon.

LPG is typically delivered into an intake manifold as a liquid. As such, if the LPG volatilizes into a gas prior to passage through the fuel injector, the engine could run "lean" (starving for fuel or excessive oxygen condition), providing less than optimal engine performance (power, emissions, possible engine damage). Fuel injectors designed for gasoline are not directly vented for volatilized fuel because gasoline inherently has a lower tendency to volatilize during normal operating conditions. With this in mind, LPG fuel injectors must have a vent/return port to return volatilized fuel to the fuel storage tank via a vent/return port.

A key consideration for component cost is in the design and development costs. Modularizing a component has important advantages in borrowing key design, development, manufacturing and supplier base. Modularizing allows elements of life cycle cost such as design, development, manufacturing, maintenance, replacement and disposal to be well understood and contained. LPG fuel injectors could benefit from modularity by borrowing elements from high-production gasoline fuel injectors.

Another consideration is component reliability. As internal components are exposed to fuel of an injector, there could be component degradation over time. Some LPG injectors have O-rings and electrical components such as the actuator coil exposed to fuel. Eliminating this with hermetic welds could improve the reliability of the fuel injector.

It would therefore be desirable to provide a LPG fuel injector with high performance, low cost and high reliability.

SUMMARY OF THE INVENTION

In accordance with a first aspect of the invention, there is disclosed a fuel injector device for use with an internal combustion. The device comprises a valve group subassembly, including: a tube assembly comprising a wall having a longitudinal axis extending between a first end and a second end, the tube assembly further comprising at least one inlet hole through the wall between the first and second ends; a seat secured at the second end of the tube assembly, the seat defining an opening; an armature assembly disposed within the tube assembly, the armature assembly having a sealing member for sealing the seat opening when in contact with the seat; and a member biasing the armature assembly toward the seat.

The device also comprises a coil group subassembly including: a solenoid coil operable to displace the armature assembly with respect to the seat; the valve group assembly being disposed in a central bore of the coil group subassembly.

The device additionally comprises an O-ring retaining cup including: a cylindrical sleeve portion surrounding at least a portion of the tube assembly and having at least one inlet opening coincident with the at least one inlet hole of the tube assembly; first and second external O-ring grooves encircling the sleeve portion on respective sides of the at least one inlet opening; and first and second circumferential welds connecting the cylindrical sleeve to the tube assembly on respective sides of the at least one inlet opening.

The O-ring retaining cup may be axially symmetric about the longitudinal axis. The seat may include a frusto-conical surface facing the armature assembly.

The tube assembly may comprise a cylindrical outer surface and the sleeve portion of the O-ring retaining cup may include a cylindrical inner bore closely fitting the cylindrical outer surface of the tube assembly. The first and second circumferential welds may provide hermetic seals preventing the passage of fuel between the tube assembly and the O-ring retaining cup.

The O-ring retaining cup may further comprise an axially facing shoulder abutting an axially facing shoulder of the coil group subassembly for providing an axial location of the O-ring retaining cup relative to the coil group subassembly. The at least one inlet hole may comprise a plurality of inlet holes evenly spaced around a circumference of the tube wall.

In accordance with a second aspect of the invention, there is disclosed a fuel injector assembly method. A coil group subassembly is assembled over a valve group subassembly. The valve group subassembly includes a tube assembly comprising a wall having a longitudinal axis extending between a first end and a second end, the tube assembly further comprising at least one inlet hole through the wall between the first and second ends. The valve group subassembly further includes a seat secured at the second end of the tube assembly, the seat defining an opening; an armature assembly disposed within the tube assembly, the armature assembly having a sealing member for sealing the seat opening when in contact with the seat; and a member biasing the armature assembly toward the seat. The coil group subassembly includes a solenoid coil operable to displace the armature assembly with respect to the seat.

An O-ring retaining cup is assembled over at least the valve group subassembly. The O-ring retaining cup includes: a sleeve portion comprising a cylindrical wall and at least one inlet opening through the wall; and first and second external O-ring grooves encircling the sleeve portion on respective sides of the at least one inlet opening; the O-ring retaining cup being assembled over at least the valve group subassembly so that the at least one inlet opening of the cup is coincident with the at least one inlet hole of the valve group assembly.

First and second circumferential welds are then welded. The welds connect the cylindrical sleeve to the tube assembly, the first and second welds being on opposite sides of the at least one inlet opening.

The method may also comprise the additional step of fixedly connecting the first and second attaching portions together. The fixedly connecting may comprise welding. The step of fixedly connecting the first and second attaching portions together may be performed before the step of inserting the O-ring retaining cup over at least the valve group subassembly.

The at least one inlet opening may comprise a plurality of circumferentially spaced inlet openings and the step of assembling the cup may further comprise aligning the inlet openings with circumferentially spaced inlet holes in the wall of the valve group assembly.

In accordance with a third aspect of the invention, there is disclosed a system for providing LPG fuel to an engine intake manifold of an internal combustion engine. The system includes an LPG fuel tank; a pump connected to the fuel tank for pressurizing fuel from the tank; and a shut-off valve connected for receiving pressurized fuel from the pump. The system further comprises an LPG fuel injector including: a tube assembly comprising a wall having a longitudinal axis extending between a first end and a second end, the wall defining a longitudinal passageway from the first end to the second end, the tube assembly further comprising at least one inlet hole through the wall between the first and second ends, the inlet hole being connected to receive pressurized LPG fuel from the shut-off valve; a tube assembly comprising a wall having a longitudinal axis extending between a first end and a second end, the wall defining a longitudinal passageway from the first end to the second end, the tube assembly further comprising at least one inlet hole through the wall between the first and second ends, the inlet hole being connected to receive pressurized LPG fuel from the shut-off valve; a seat secured at the second end of the tube assembly, the seat defining an opening; an armature assembly disposed within the tube assembly, the armature assembly having a sealing member for sealing the seat opening when in contact with the seat; a member biasing the armature assembly toward the seat; and a solenoid coil operable to displace the armature assembly with respect to the seat.

The system further comprises a vent line connecting the first end of the tube assembly to the shut-off valve for returning excess fuel vented axially through the tube assembly to the first end; the second end of the tube assembly extends into the engine intake manifold for injecting pressurized fuel from the injector; and a controller electrically connected for actuating the solenoid coil to inject fuel into the intake manifold.

The LPG fuel injector may further comprise: an O-ring retaining cup including: a cylindrical sleeve portion surrounding at least a portion of the tube assembly and having at least one inlet opening coincident with the at least one inlet hole of the tube assembly.

The O-ring retaining cup may further include: a first circumferential weld connecting the cylindrical sleeve to the tube assembly on a first side of the at least one inlet opening; and a second circumferential weld connecting the cylindrical sleeve to the tube assembly on a second side of the at least one inlet opening.

The system may also comprise a fuel rail connected for receiving pressurized fuel from the shut-off valve and for delivering pressurized fuel to the injector; wherein the O-ring retaining cup further includes: first and second circumferential O-ring grooves on respective sides of the at least one inlet opening for sealing the injector to the fuel rail.

The at least one inlet hole may comprise a plurality of inlet holes circumferentially spaced around the wall. The fuel injector may be oriented with the first end of the tube assembly higher than the second end. The shut-off valve may further comprise a regulator.

These aspects of the invention and further advantages thereof will become apparent to those skilled in the art as the present invention is described with particular reference to the accompanying drawings.

DESCRIPTION OF THE INVENTION

The inventor has developed apparatus, methods and systems for a modular constructed fuel injector supplying LPG (Liquid Petroleum Gas) to an internal combustion engine.

Figure 1:
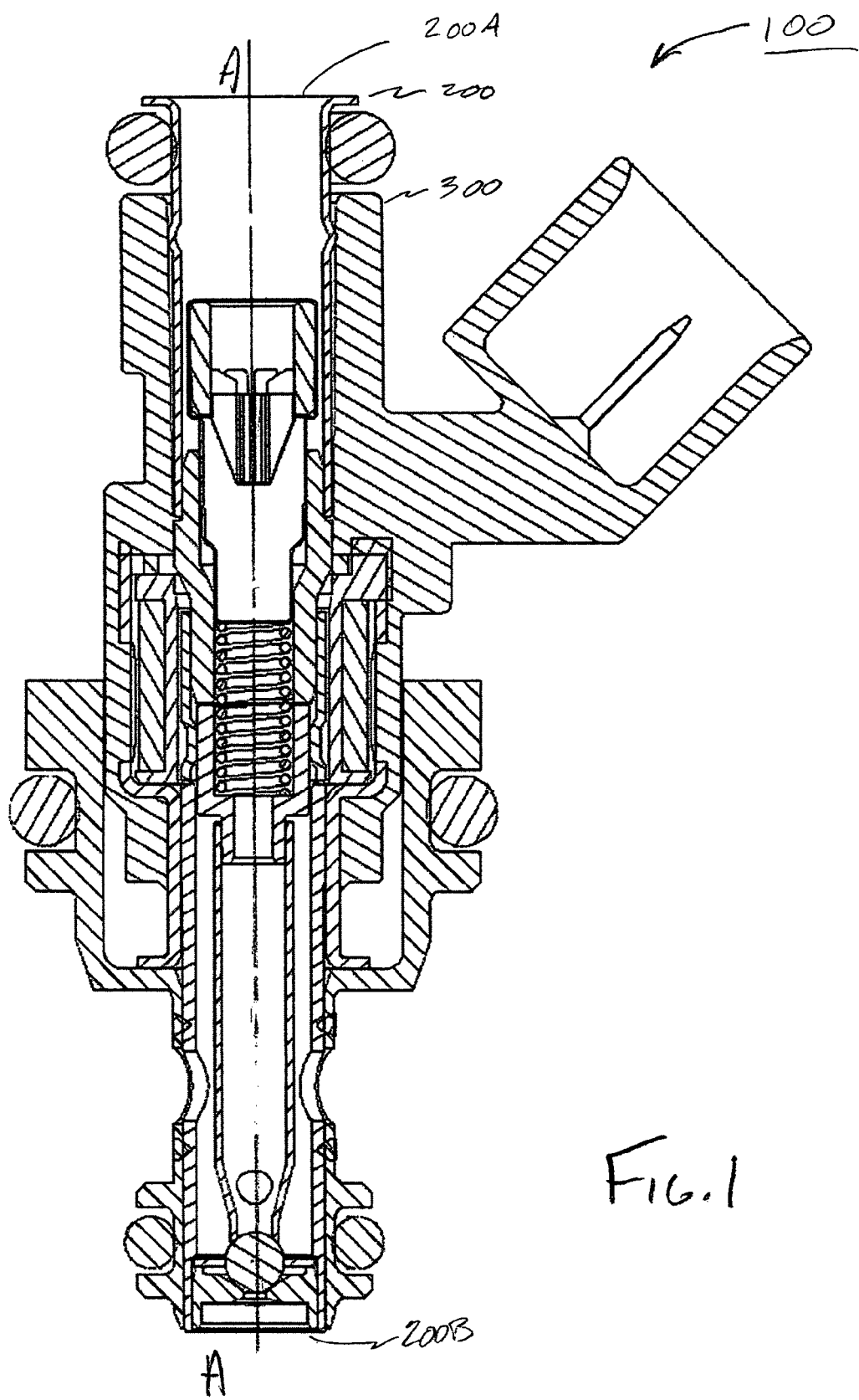
FIG. 1 is a sectional view of a fuel injector assembly according to one embodiment of the invention.

A cross-sectional view of a fuel injector 100 according to one embodiment of the invention is shown in FIG. 1. While the invention is described in connection with that exemplary fuel injector, one skilled in the art will understand that the inventive apparatus, system and method are applicable to other fuel injector designs. Embodiments of the invention may further be used in other fuel injection applications where other 'greener' hydrocarbon fuel use (CNG, LNG for example, as alternatives to gasoline or diesel) may be advantageous.

Referring to FIG. 1, a solenoid actuated fuel injector 100 dispenses a quantity of fuel that is to be combusted in an internal combustion engine (not shown). The fuel injector 100 extends along a longitudinal axis A-A between a first injector end 200A and a second injector end 200B, and includes a valve group subassembly 200 (also shown in FIG. 2), a coil group subassembly 300 (also shown in FIG. 3) and an O-ring retaining cup 400 (also shown in FIG. 4). The valve group subassembly 200 performs fuel handling functions, e.g., defining a fuel flow path and prohibiting fuel flow through the injector 100. The coil group subassembly 300 performs electrical functions, e.g., converting electrical signals to a driving force for permitting fuel flow through the injector 100. The O-ring retaining cup 400 when welded in the later specified locations provides at least two functions: first, mechanical attachment of the cup to the injector, and second, a seal to the external environment.

Figure 2:
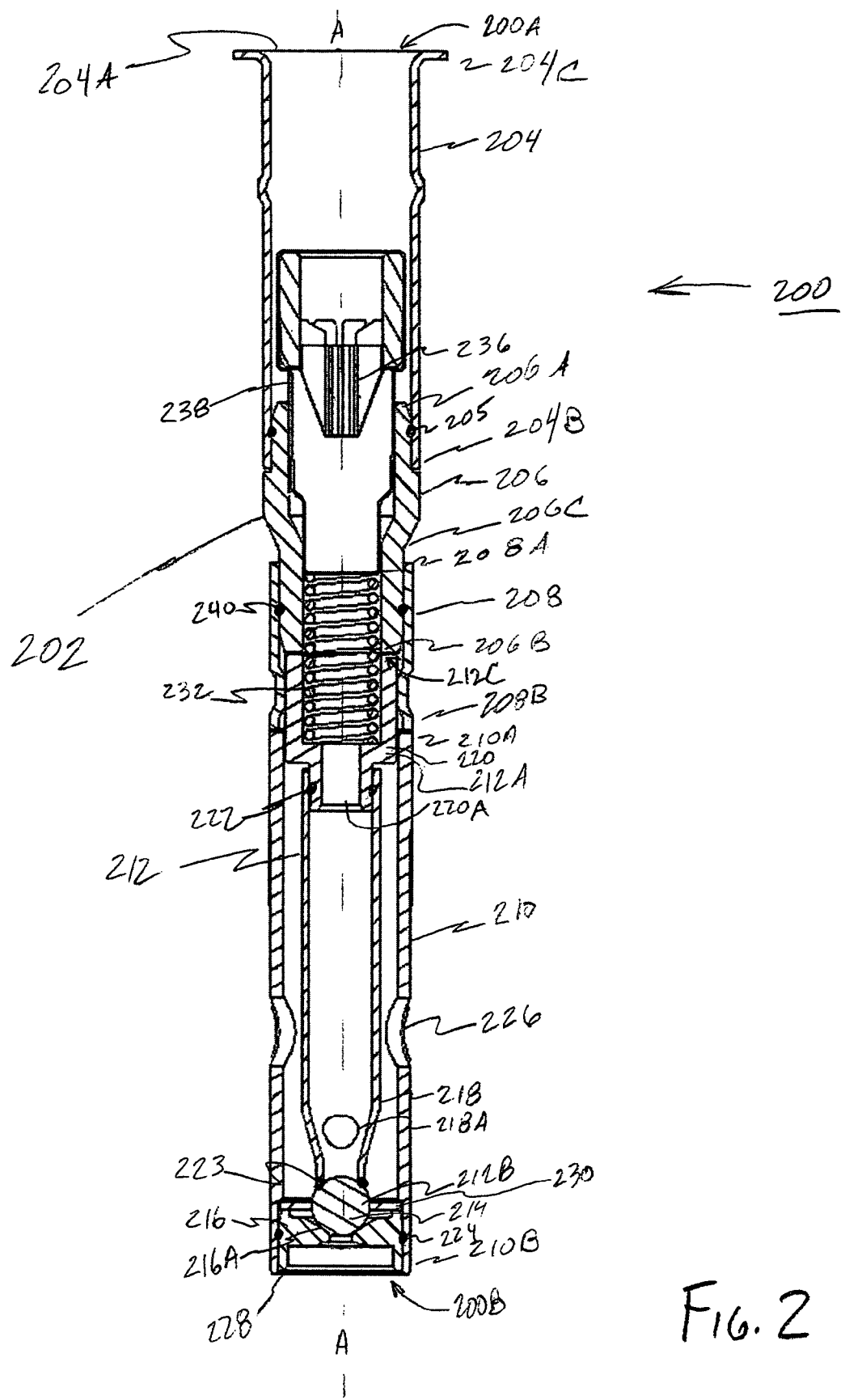
FIG. 2 is a sectional view of a valve group subassembly portion of the fuel injector of FIG. 1.

As shown in FIG. 2, the valve group subassembly 200 includes tube assembly 202 comprising tube sections 204, 206, 208 and 210 extending along the longitudinal axis A-A between the first fuel injector end 200A and the second fuel injector end 200B. The tube assembly 202 in this embodiment includes an outlet tube 204, a pole piece 206, a non magnetic shell 208 and a valve body 210. The outlet tube 204 has a first tube end 204A proximate to the first fuel injector end 200A. The outlet tube 204 can be flared at the end 204A into a flange 204C to retain an O-ring (not shown). A second outlet tube end 204B of the outlet tube 204 is connected to a first pole piece end 206A of the pole piece 206. The pole piece 206 may comprise a stainless steel material such as SS430FR (ASTM A838-00). A second pole piece end 206B of pole piece 206 is connected to the first shell end 208A of a non-magnetic shell 208. The non-magnetic shell 208 can comprise non-magnetic stainless steel, e.g., 300-series stainless steels such as SS305 (EN 10088-2), or other materials that have similar structural and magnetic properties. A second shell end 208B of non-magnetic shell 208 is connected to the first valve body end 210A of valve body 210.

As shown in FIG. 2, outlet tube 204 is attached to pole piece 206 by means of welds 205. Formed into the outer surface of pole piece 206 are pole piece shoulders 206C, which, in conjunction with mating shoulders of a bobbin of the coil subassembly, act as positive mounting stops when the two subassemblies are assembled together. The length of pole piece 206 is fixed whereas the length of the outlet tube 204 can vary according to operating requirements of the particular fuel injector design. By forming outlet tube 204 separately from pole piece 206, varying outlet length injectors can be manufactured by using different length outlet tubes during the assembly process. The outlet tube 204 can be attached to the pole piece 206 at an inner circumferential surface of the pole piece 206. Alternatively, an integral outlet tube and pole piece can be attached to the inner circumferential surface of a non-magnetic shell 208.

An armature assembly 212 is disposed in the tube assembly 202. The armature assembly 212 includes a first armature assembly end having a ferro-magnetic or armature portion 212A and a second armature assembly end having a sealing portion 212B. The armature assembly 212 is disposed in the tube assembly 202 such that a shoulder 212C of the armature 212A confronts a shoulder 206B of the pole piece 206. The sealing portion can include a closure member 214, e.g., a spherical valve element, that is moveable with respect to a sealing element seat 216 and its sealing surface 216A. The closure member 214 is movable between a closed configuration, as shown in FIGS. 1 and 2, and an open configuration (not shown). In the closed configuration, the closure member 214 contiguously engages the sealing surface 216A to prevent fluid flow through the opening. In the open configuration, the closure member 214 is spaced from a sealing element seat 216 to permit fluid flow through the opening. The armature assembly 212 may also include an armature intermediate portion 218 connecting the ferro-magnetic or armature portion 220 to the closure member 214. The armature intermediate portion 218 may be attached to the armature 212A and closure member 214 by weld beads 222, 223, respectively.

Surface treatments can be applied to at least one of the end portions of pole piece 206B and armature assembly 212C to improve the armature's response, reduce wear on the impact surfaces and variations in the working air gap between the respective end portions 206B and 212C. The surface treatments can include coating, plating or case-hardening. Coatings or platings can include, but are not limited to, hard chromium plating, nickel plating or keronite coating. Case hardening on the other hand, can include, but is not limited to, nitriding, carburizing, carbo-nitriding, cyaniding, heat, flame, spark or induction hardening.

Fuel enters the injector through a minimum of one fuel inlet port 226. The shape of the fuel inlet port 226 can be of any shape. In a preferred embodiment, four circular ports are provided at even spaced circumferential positions around the wall of the valve body 210. A fuel venting path through the armature assembly 212 can be provided by at least one axially extending through-bore 220A and at least one aperture 218A through a wall of the armature assembly 218. The apertures 218A, which can be of any shape, are preferably non-circular, e.g., axially elongated, to facilitate the passage of gas bubbles. The apertures 218A provide fluid communication between the at least one through-bore 220A and the interior of the valve body 210. In the open configuration, fuel can be communicated from the fuel inlet port 226, around the armature intermediate portion 218, past the closure member 214 and through metering orifice openings of an orifice disk 228 into the engine (not shown). In the closed configuration (such as for fuel venting), fuel flow can be communicated from the fuel inlet port 226, around the armature intermediate portion 218, into one of the apertures 218A, through a wall of the armature assembly 218 and through the axially extending through-bore 220A up through the injector and out the end 204A of the outlet tube 204.

As a further alternative, a two-piece armature having an armature portion directly connected to a closure member can be utilized. Although both the three-piece and the two-piece armature assemblies are interchangeable, the three-piece armature assembly is preferable due to its ability to reduce magnetic flux leakage from the magnetic circuit of the fuel injector 100 according to the present invention. It should be noted that the armature intermediate portion 218 of the three-piece armature assembly can be fabricated by various techniques, for example, a plate can be rolled and its seams welded or a blank can be deep-drawn to form a seamless tube.

The sealing element seat 216 is secured at the second end of the tube assembly 202 by weld 224. An orifice disk 228 can be used in connection with the sealing element seat 216 to provide at least one precisely sized and oriented orifice in order to obtain a particular fuel spray pattern and targeting. The precisely sized and oriented orifice can be disposed on the center axis of the orifice disk 228 or, preferably disposed off-axis, and oriented in any desirable angular configuration relative to one or more reference points on the fuel injector 100. It should be noted here that both the sealing element seat 216 and orifice disk 228 are fixedly attached to the valve body 210 by known conventional attachment techniques, including, for example, laser welding, crimping, and friction welding or conventional welding. The orifice disk 228 is preferably tack welded to the sealing element seat 216 in a fixed spatial orientation to provide the particular fuel spray pattern and targeting of the fuel spray.

In the case of a spherical valve element providing the closure member 214, the spherical valve element can be connected to the armature assembly 212 at a diameter that is less than the diameter of the spherical valve element. Such a connection would be on side of the spherical valve element that is opposite contiguous contact with the sealing element seat 216. A lower armature assembly guide 230 can be disposed in the tube assembly 202, proximate the sealing element seat 216, and would slidingly engage the diameter of the spherical valve element. The lower armature assembly guide 230 can facilitate alignment of the armature assembly 212 along the longitudinal axis A-A.

A resilient member 232 is disposed in the tube assembly 202 and biases the armature assembly 212 toward the sealing element seat 216. A preload adjuster 238 is also disposed in the tube assembly 202. The preload adjuster 238 may include a filter 236. The preload adjuster 238 is disposed generally proximate to the second end of the tube assembly 202. The preload adjuster 238 engages the resilient member 232 and adjusts the biasing force of the resilient member 232 with respect to the tube assembly 202. In particular, the preload adjuster 238 provides a reaction member against which the resilient member 232 reacts in order to close the injector valve 100 when the power group subassembly 300 is de-energized. The position of the preload adjuster 238 can be retained with respect to the outlet tube 204 by an interference press-fit between an outer surface of the preload adjuster 238 and an inner surface of the tube assembly 202. Thus, the position of the preload adjuster 238 with respect to the outlet tube 204 can be used to set a predetermined dynamic characteristic of the armature assembly 212.

The valve group subassembly 200 can be assembled as follows. The non-magnetic shell 208 is connected to the outlet tube 204 via the pole piece 206, and to the valve body 210. The non-magnetic shell 208 and pole piece 206 are joined by the weld bead 240. Assembly of the non-magnetic shell may be performed using laser welding techniques as known in the art.

The preload adjuster 238 is inserted along the axis A-A from the first end 200A of the tube assembly 202. Next, the resilient member 232 and the armature assembly 212 (which was previously assembled) are inserted along the axis A-A from the injector outlet end 200B of the valve body 210. The preload adjuster 238 can be inserted into the outlet tube 204 to a predetermined distance so as to permit the preload adjuster 238 to preload the resilient member 232. Positioning of the preload adjuster 238 with respect to the outlet tube 204 can be used to adjust the dynamic properties of the resilient member 232, e.g., so as to ensure that the armature assembly 212 does not float or bounce during injection pulses. The sealing element seat 216 and orifice disk 228 are then inserted along the axis A-A from the second valve body end 210B of the valve body 210. The sealing element seat 216 and orifice disk 228 can be fixedly attached to one another or to the valve body 210 by known attachment techniques such as laser welding, crimping, friction welding, conventional welding, etc.

To set the lift, i.e., ensure the proper injector lift distance, several techniques may be utilized as known by those in the art. None of these methods are described here. Once the desired lift is determined, appropriate welds are made to maintain acceptable lift. The valve body 210 is then attached to the outlet tube 204 assembly by a weld, preferably a laser weld. The assembled valve group subassembly 200 is then tested, e.g., for leakage.

Figure 3:
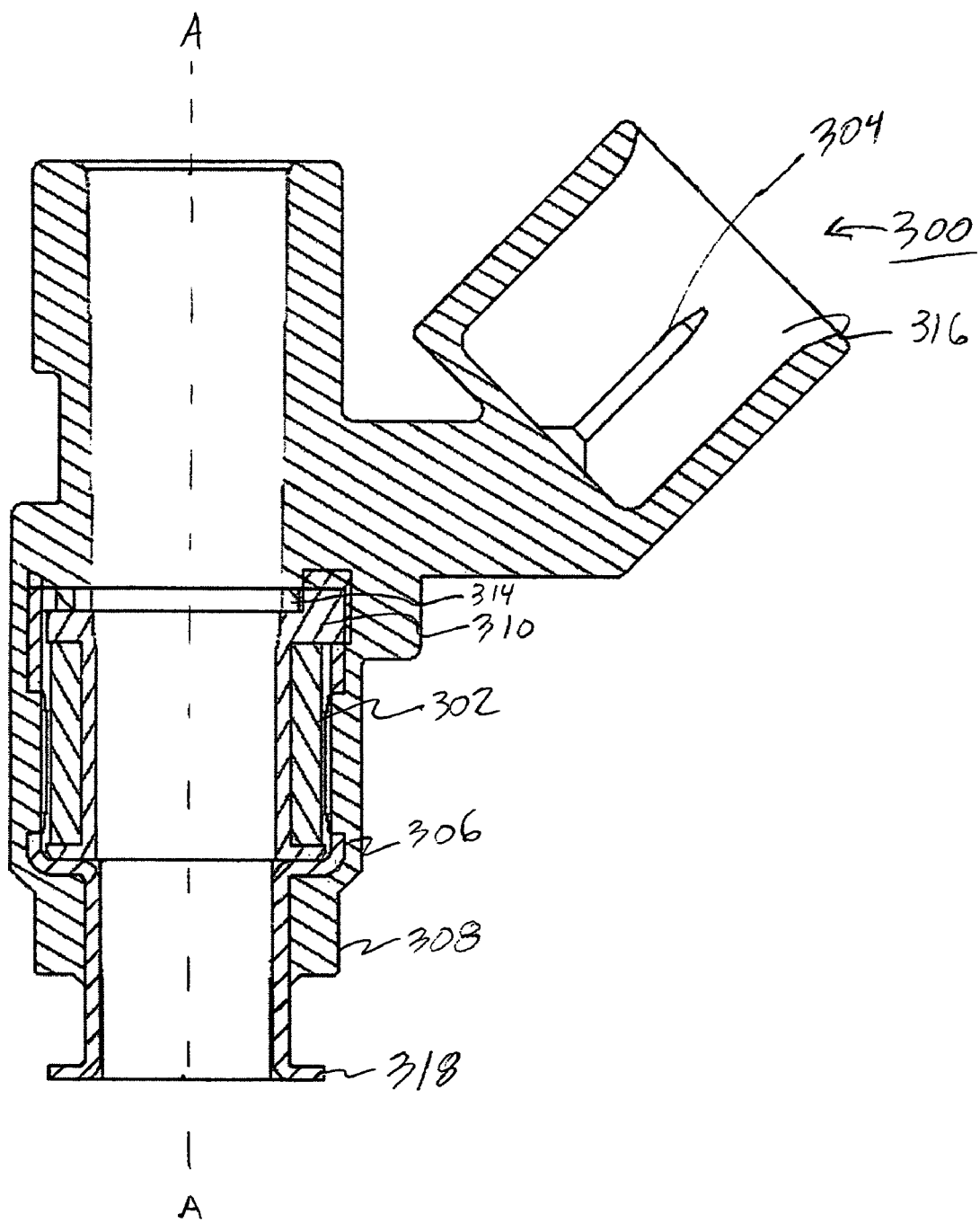
FIG. 3 is a sectional view of a coil group subassembly portion of the fuel injector of FIG. 1.

The coil group subassembly 300, shown in FIG. 3, comprises an electromagnetic coil 302, at least one terminal 304, a coil housing 306, and an overmold 308. The electromagnetic coil 302 comprises a wire that that can be wound on a bobbin 310 and electrically connected to electrical contacts (not shown) on the bobbin 310. When energized, the coil 302 generates magnetic flux that moves the armature assembly 212 (FIG. 2) toward the open configuration, thereby allowing the fuel to flow through the opening. De-energizing the electromagnetic coil 302 allows the resilient member 232 to return the armature assembly 212 to the closed configuration, thereby shutting off the fuel flow. Returning to FIG. 3, the coil housing 306, which provides a return path for the magnetic flux, generally includes a ferro-magnetic cylinder surrounding the electromagnetic coil 302 and a flux washer 314 extending from the cylinder toward the axis A-A. The flux washer 314 can be integrally formed with or separately attached to the cylinder. The coil housing 306 can include holes, slots, or other features to break-up eddy currents that can occur when the coil 302 is energized.

The overmold 308 maintains the relative orientation and position of the electromagnetic coil 302, the at least one terminal 304, and the coil housing 306. The overmold 308 includes an electrical harness connector 316 portion in which a portion of the terminal 304 is exposed. The terminal 304 and the electrical harness connector 316 portion can engage a mating connector, e.g., part of a vehicle wiring harness (not shown), to facilitate connecting the injector 100 to an electrical power supply (not shown) for energizing the electromagnetic coil 302.

According to a preferred embodiment, the magnetic flux generated by the electromagnetic coil 302 flows in a circuit that includes the pole piece 206, the armature assembly 212, the valve body 210, the coil housing 306, and the flux washer 314. The magnetic flux moves across a parasitic air gap between the homogeneous material of the ferro-magnetic or armature portion 220 and the valve body 210 into the armature assembly 212 and across a working air gap between end portions 206B and 212A towards the pole piece 206, thereby lifting the closure member 214 away from the sealing element seat 216.

The preparation of the coil group sub-assembly 300, which may include (a) the coil housing 306, (b) the bobbin assembly including the terminals 304, (c) the flux washer 314, and (d) the overmold 308, can be performed separately from the valve group subassembly 200.

According to a preferred embodiment, wire is wound onto a pre-formed bobbin 310 having electrical connector portions 312 to form a bobbin assembly. The bobbin assembly is inserted into a pre-formed coil housing 306. To provide a return path for the magnetic flux between the pole piece 206 and the coil housing 306, flux washer 314 is mounted on the bobbin assembly. A pre-bent terminal 304 having axially extending connector portions are coupled to the electrical contact portions 312 of the coil and brazed, soldered welded, or, preferably, resistance welded. The partially assembled power group assembly is now placed into a mold (not shown). By virtue of its pre-bent shape, the terminals 304 will be positioned in the proper orientation with the harness connector 316 when an overmold polymer 308 is poured or injected into the mold. Alternatively, two separate molds (not shown) can be used to form a two-piece overmold. Additionally, a portion of the coil housing 306 can extend axially beyond an end of the overmold 308 to allow the injector to accommodate different length injector tips. The extended portion may be formed with a flange 318 to provide axial positioning for the O-ring retaining cup 400 as described below.

The assembled coil group subassembly 300 can be mounted on a test stand to determine the solenoid's pull force, coil resistance and the drop in voltage as the solenoid is saturated during energizing of the coil.

The inserting of the valve group subassembly 200 into the coil group subassembly 300 operation can involve setting the relative rotational orientation of valve group subassembly 200 with respect to the coil group subassembly 300. According to the preferred embodiments, the valve group and the coil group subassemblies can be rotated such that the included angle between the reference point(s) on the orifice disk 228 (including opening(s) thereon) and a reference point on the injector harness connector 316 are within a predetermined angle. The relative orientation can be set using robotic cameras or computerized imaging devices to look at respective predetermined reference points on the subassemblies, calculate the angular rotation necessary for alignment, orient the subassemblies and then check with another look and so on until the subassemblies are properly oriented. Once the desired orientation is achieved, the subassemblies are inserted together. The inserting operation can be accomplished by one of two methods: "top-down" or "bottom-up." According to the former, the coil group subassembly 300 is slid downward from the top of the valve group subassembly 200, and according to the latter, the coil group subassembly 300 is slid upward from the bottom of the valve group subassembly 200. In situations where the outlet tube 204 includes a flared first end, bottom-up method is required. Also in those situations, the O-ring (not shown) that is retained by the flared first end can be positioned around the coil group subassembly 300 prior to sliding the valve group subassembly 200 into the coil group subassembly 300. After inserting the valve group subassembly 200 into the coil group subassembly 300, those two subassemblies are affixed together, e.g., by welding, such as laser welding the valve body 210 to the flange 318. Of course, other methods of affixing the subassemblies with respect to one another can be used.

In operation, the electromagnetic coil 302 (FIG. 3) is energized, thereby generating magnetic flux in the magnetic circuit. The magnetic flux moves armature assembly 212 (FIG. 2, along the axis A-A, according to a preferred embodiment) towards the pole piece 206, closing the working air gap. That movement of the armature assembly 212 separates the closure member 214 from the sealing element seat 216 and allows fuel to flow from the fuel inlet port 226, around the armature intermediate portion 218, past the closure member 214 and through metering orifice openings of an orifice disk 228 into the engine (not shown). When the electromagnetic coil 302 is de-energized, the armature assembly 212 is moved by the bias of the resilient member 232 to contiguously engage the closure member 214 with the sealing element seat 216, and thereby prevent fuel flow through the injector 100.

Figure 4:
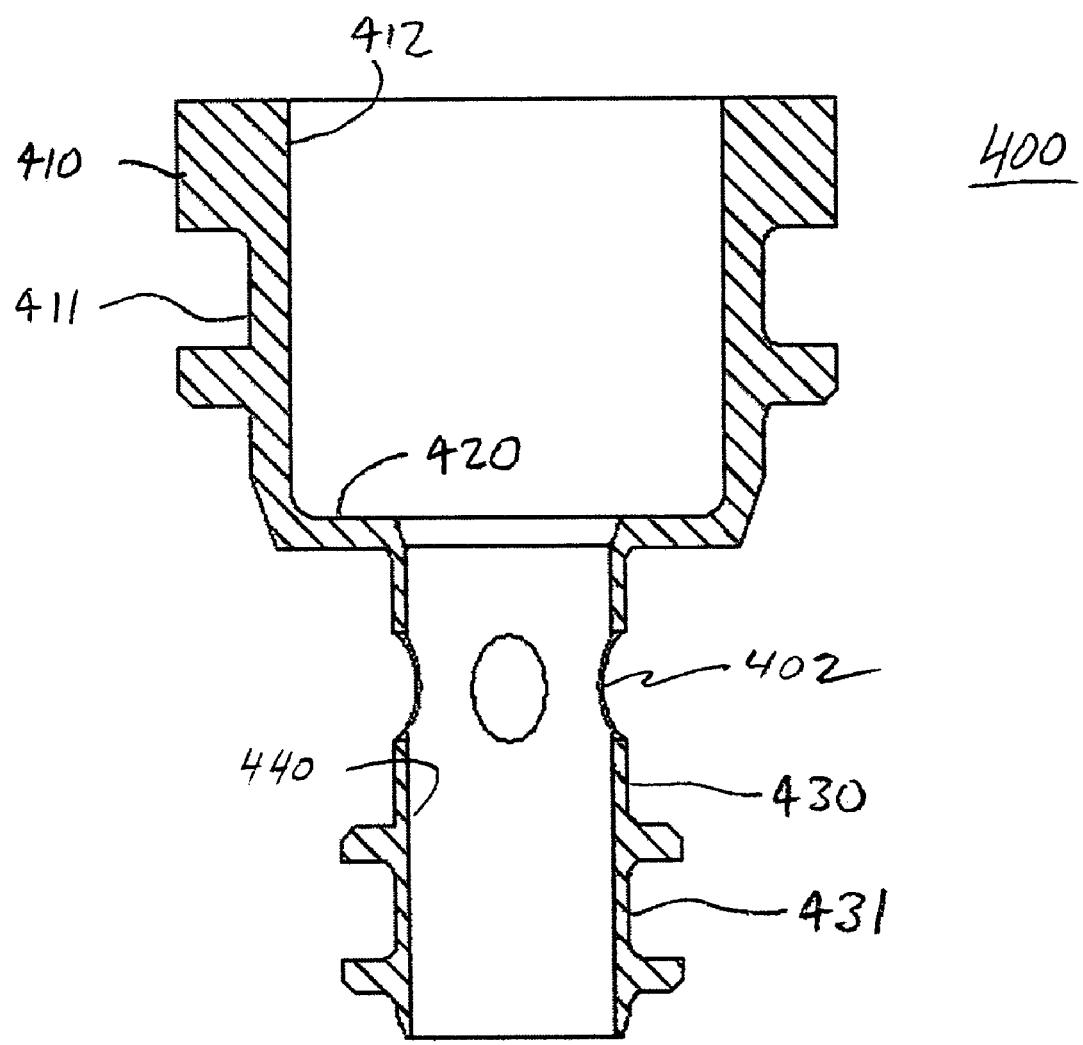
FIG. 4 is a sectional view of an O-ring retaining cup portion of the fuel injector of FIG. 1.

Referring to FIG. 4, an O-ring retaining cup 400 is shown. The O-ring retaining cup 400 is the interface between the subassembly comprising the valve group 200 and the coil group 300, and the intake manifold of an engine (not shown). A fuel inlet port 402 is located in a cylindrical sleeve portion 430 of the O-ring retaining cup 400 and can be of any shape. In a preferred embodiment, four circular ports are provided at evenly spaced circumferential positions. A first cylindrical portion 410 of the O-ring retaining cup 400 provides an appropriately sized outer diameter to allow assembly with the inner diameter of an intake manifold (not shown). A first O-ring groove 411 of the O-ring retaining cup 400 can be fitted with an appropriate O-ring (not shown) to provide sealing to the intake manifold. A first cylindrical bore 412 of the first cylindrical portion 410 provides an appropriately sized inner diameter to fit with the outer diameter of the overmold 308 portion of the coil group 300 (FIG. 3) while an axial shoulder 420 of the cup is designed to contact flange 318 portion of the coil group 300 (also FIG. 3) during assembly.

Returning to FIG. 4 and similar to the first O-ring groove 411 of the O-ring retaining cup 400, a second O-ring groove 431 of the O-ring retaining cup 400 can be fitted with an appropriate O-ring (not shown) to provide sealing to the intake manifold. The second cylindrical bore 440 of the O-ring retaining cup 400 provides an appropriately sized inner diameter to fit the outer diameter of the valve body 210 of the valve group 200 (FIG. 2) during assembly.

Returning to FIG. 4, the O-ring retaining cup 400 is designed and constructed such that, when inserted over the subassembly comprised of the valve group 200 and the coil group 300, at least one fuel inlet port 402 on the O-ring retaining cup 400 is aligned with at least one fuel inlet port 226 of the valve group 200. Alignment can be set using robotic cameras or computerized imaging devices to look at respective predetermined reference points on the subassemblies, calculate the angular rotation necessary for alignment, orient the subassemblies and then check with another look and so on until the subassemblies are properly oriented.

Figure 5:
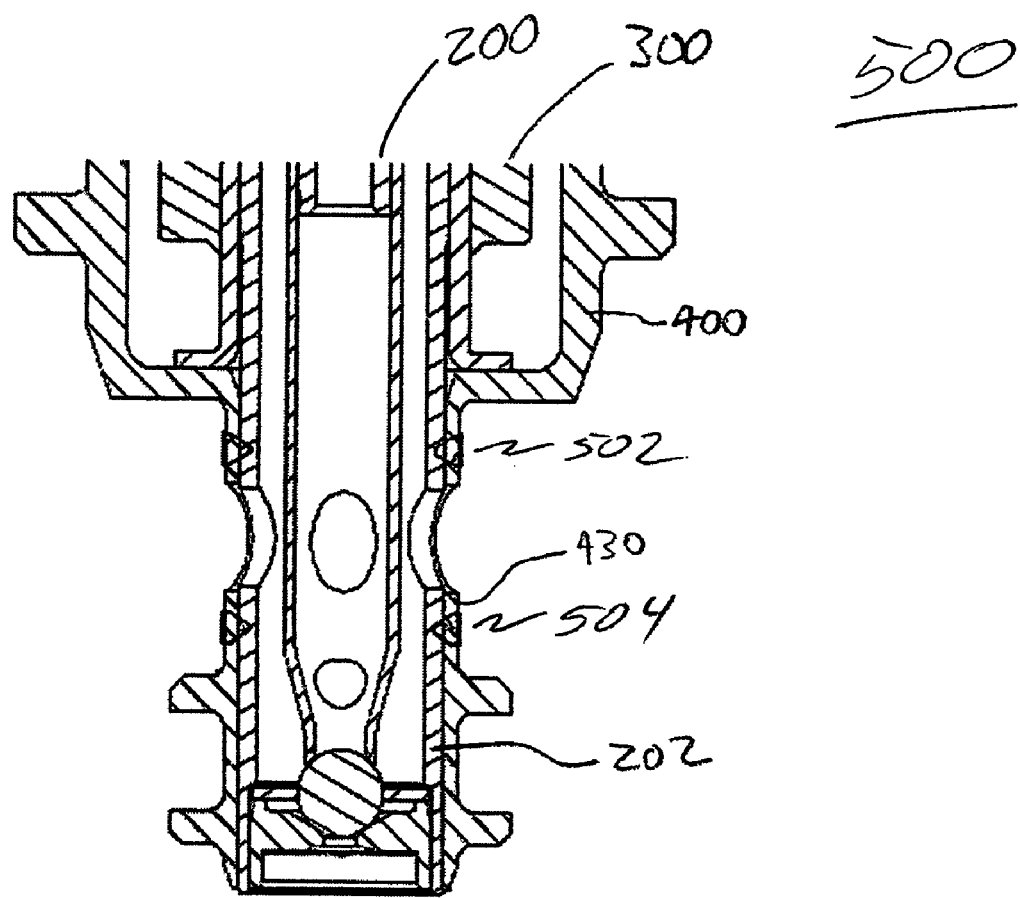
FIG. 5 is an enlargement of a weld area of a fuel injector assembly according to the invention.

Referring to FIG. 5, an enlarged view of a weld area of the aligned/welded O-ring retaining cup 400 and the subassembly comprising the valve group 200 and the coil group 300 is shown. Once the subassemblies are assembled and desired orientation is achieved, the cylindrical sleeve portion 430 the O-ring retaining cup 400 is welded to the valve body 210 of the valve group 200 by welds 502 and 504 applied above and below fuel inlet ports, respectively. Proper alignment of the inlet ports in the valve body 210 an in the cylindrical sleeve portion 430 will assure adequate fuel supply for proper operation of the injector 100. The welds 502 and 504 may be laser welds. The welds must be complete circumferential welds to provide hermetic seals between the two welded components. The welds 502 and 504 serve two functions. First, the welds provide mechanical attachment of the O-ring retaining cup 400 to the valve body 210, and thus to the subassembly comprised of the valve group 200 and the coil group 300. Second, the welds provide a seal so fuel will flow properly into, through and out of the injector 100 without leakage. After welding, as described above, O-rings of suitable size and material may be installed in the first O-ring groove 411 and the second O-ring groove 431 of the O-ring attachment cup 400.

Figure 6:
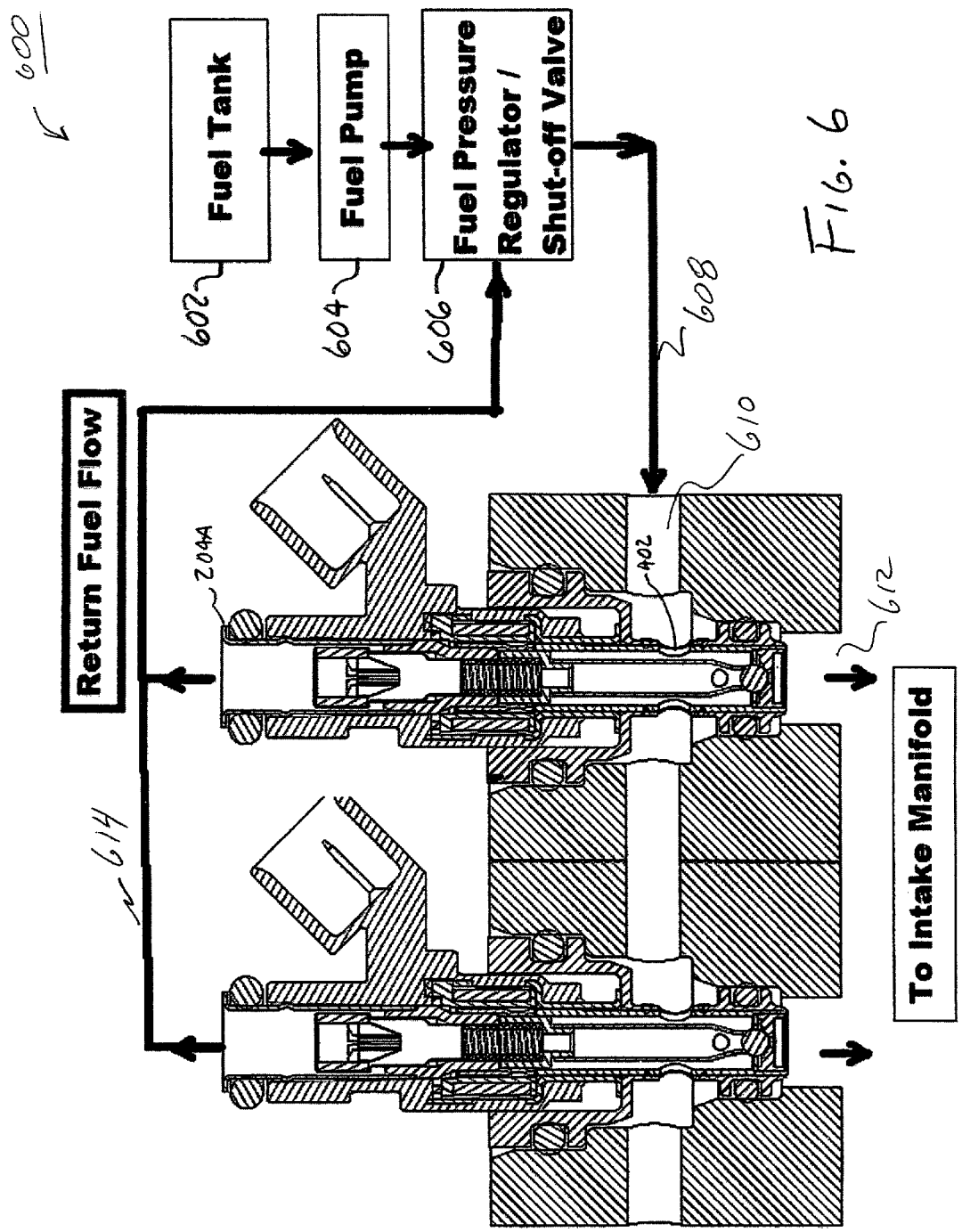
FIG. 6 is a fuel flow diagram for a LPG fuel fuel system according to the invention.

Referring to FIG. 6, an exemplary fuel flow diagram 600 is shown. LPG is stored in a fuel tank 602 designed for LPG storage. Fuel is pumped by a fuel pump 604 to a pressure in excess of what is needed for delivery and use by the injector. The pressure is regulated down by a fuel pressure regulator 606 which may also comprise a safety shut-off valve. Fuel at the appropriate pressure is then delivered via appropriate supply fuel line 608 to a fuel rail 610. The fuel rail is arranged such that fuel in a pressurized passageway of the fuel rail 610 is provided at the fuel inlet port 402 of the fuel injector 100. The injector is further positioned to discharge fuel into intake manifold 612 when the injector 100 is appropriately energized. Because of the volatile nature of LPG, a return fuel flow line 614 is provided to return fuel vapor to the fuel pressure regulator/shut-off valve 606. Return fuel flow is along the axis of the injector toward the end 204A of the injector. In a preferred embodiment, the injector is positioned in the manifold with the end 204A higher than the orifice end to provide vapor venting.

Configuration of multiple fuel injectors 100 and fuel rails 610 will be application specific as location of fuel injectors 100 and fuel rails 610 will depend on the intake manifold configuration specific to an internal combustion engine. The fuel injector 100 typically adjusts the amount of fuel delivered to the intake manifold 612 by a method called pulse width modulation, as understood by those in the art. Excess fuel may be returned through the return fuel line(s) 614, again, configuration being application specific.

Figure 7:
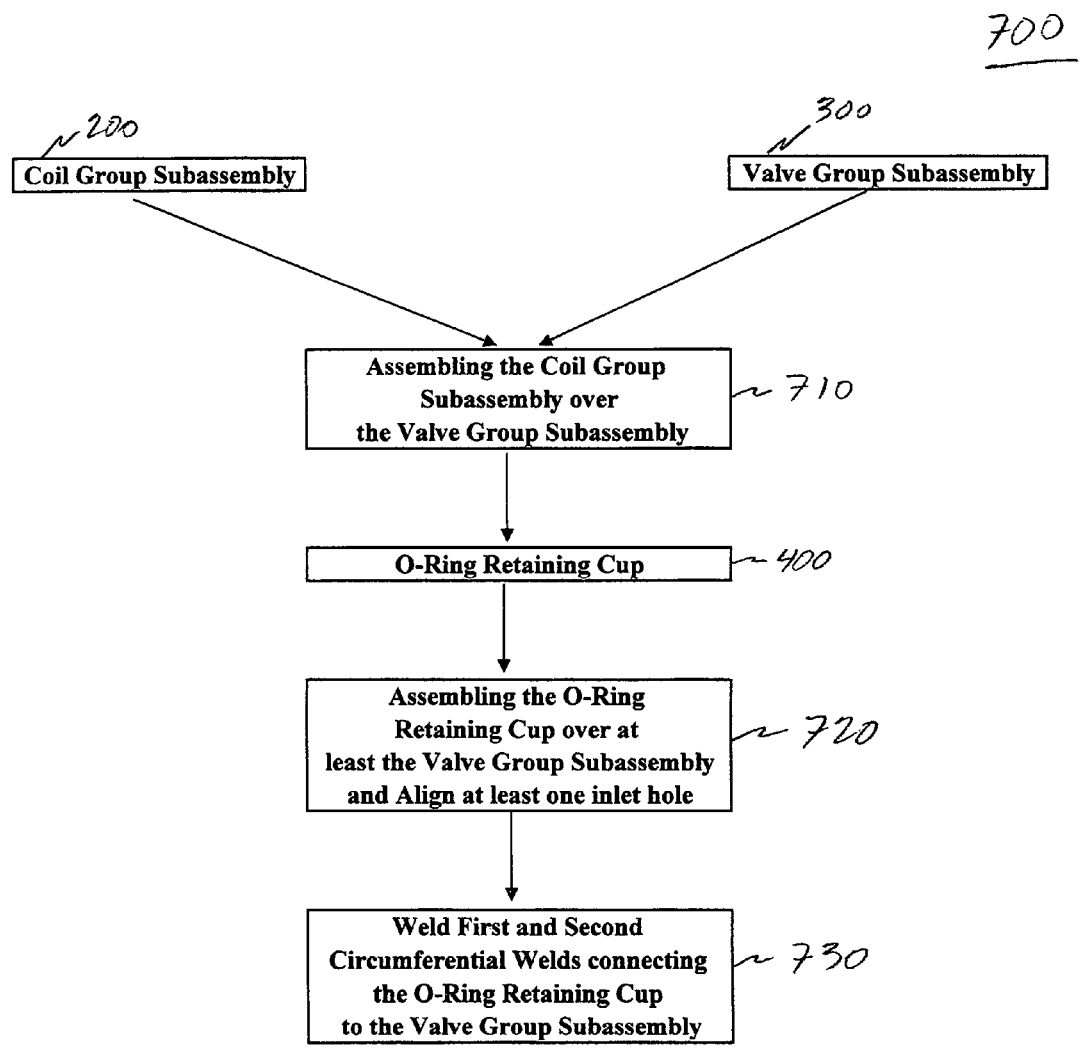
FIG. 7 is a flow chart depicting an assembly method according to one embodiment of the invention.

Referencing FIG. 7, an exemplary assembly method flow diagram 700 is shown. The valve group subassembly 200 (as described above with reference to FIG. 2) and the coil group subassembly 300 (described above with reference to FIG. 3) are presented for alignment, aligned relative to each other, inserted and affixed together as described above (step 710). The O-ring retaining cup 400 is then presented for alignment to the subassembly consisting of the valve group subassembly 200 and the coil group subassembly 300, aligned relative to each other, inserted (step 720) and affixed together with circumferential welds 502 and 504 as described above (step 730).

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. For example, while the apparatus and method are disclosed herein with reference to an LPG fuel injector, the invention may be used to provide other fuel injectors where venting volatile fuel is an issue. It is to be understood that the embodiments shown and described herein are only illustrative of the principles of the present invention and that various modifications may be implemented by those skilled in the art without departing from the scope and spirit of the invention.

I claim:

1. A fuel injector for use with an internal combustion engine, the fuel injector comprising:
   a valve group subassembly including:
      a tube assembly comprising a wall having a longitudinal axis extending between a first end and a second end, the tube assembly further comprising at least one inlet hole through the wall between the first and second ends;
      a seat secured at the second end of the tube assembly, the seat defining an opening;
      an armature assembly disposed within the tube assembly, the armature assembly having a sealing member for sealing the seat opening when in contact with the seat; and
      a member biasing the armature assembly toward the seat;
   a coil group subassembly including:
      a solenoid coil operable to displace the armature assembly with respect to the seat;
      the valve group assembly being disposed in a central bore of the coil group subassembly; and
   an O-ring retaining cup including:
      a cylindrical sleeve portion surrounding at least a portion of the tube assembly and having at least one inlet opening coincident with the at least one inlet hole of the tube assembly;
      first and second external O-ring grooves encircling the sleeve portion on respective sides of the at least one inlet opening; and
      first and second circumferential welds connecting the cylindrical sleeve to the tube assembly on respective sides of the at least one inlet opening.

2. The fuel injector according to claim 1, wherein the O-ring retaining cup is axially symmetric about the longitudinal axis.

3. The fuel injector according to claim 1, wherein the seat includes a frusto-conical surface facing the armature assembly.

4. The fuel injector according to claim 1, wherein the tube assembly comprises a cylindrical outer surface and the sleeve portion of the O-ring retaining cup includes a cylindrical inner bore closely fitting the cylindrical outer surface of the tube assembly.

5. The fuel injector according to claim 1, wherein the first and second circumferential welds provide hermetic seals preventing the passage of fuel between the tube assembly and the O-ring retaining cup.

6. The fuel injector according to claim 1, wherein the O-ring retaining cup further comprises an axially facing shoulder abutting an axially facing shoulder of the coil group subassembly for providing an axial location of the O-ring retaining cup relative to the coil group subassembly.

7. The fuel injector according to claim 1, wherein at least one inlet hole comprises a plurality of inlet holes evenly spaced around a circumference of the tube wall.

8. A method of assembling a fuel injector, comprising:
   assembling a coil group subassembly over a valve group subassembly, the valve group subassembly including
      a tube assembly comprising a wall having a longitudinal axis extending between a first end and a second end, the tube assembly further comprising at least one inlet hole through the wall between the first and second ends;
      a seat secured at the second end of the tube assembly, the seat defining an opening;
      an armature assembly disposed within the tube assembly, the armature assembly having a sealing member for sealing the seat opening when in contact with the seat; and
      a member biasing the armature assembly toward the seat; and
   the coil group subassembly including
      a solenoid coil operable to displace the armature assembly with respect to the seat;
   assembling an O-ring retaining cup over at least the valve group subassembly, the O-ring retaining cup including:
      a sleeve portion comprising a cylindrical wall and at least one inlet opening through the wall; and
      first and second external O-ring grooves encircling the sleeve portion on respective sides of the at least one inlet opening;
      the O-ring retaining cup being assembled over at least the valve group subassembly so that the at least one inlet opening of the cup is coincident with the at least one inlet hole of the valve group assembly;
   welding first and second circumferential welds connecting the cylindrical sleeve to the tube assembly, the first and second welds being on opposite sides of the at least one inlet opening.

9. The method according to claim 8, further comprising the step of:
   fixedly connecting the first and second attaching portions together.

10. The method according to claim 9, wherein the fixedly connecting comprises welding.

11. The method according to claim 9, wherein the step of fixedly connecting the first and second attaching portions together is performed before the step of inserting the O-ring retaining cup over at least the valve group subassembly.

12. The method according to claim 8, wherein the at least one inlet opening comprises a plurality of circumferentially spaced inlet openings and wherein the step of assembling the cup further comprises aligning the inlet openings with circumferentially spaced inlet holes in the wall of the valve group assembly.

13. A system for providing LPG fuel to an engine intake manifold of an internal combustion engine, comprising:
   an LPG fuel tank;
   a pump connected to the fuel tank for pressurizing fuel from the tank;
   a shut-off valve connected for receiving pressurized fuel from the pump;
   an LPG fuel injector including:
      a tube assembly comprising a wall having a longitudinal axis extending between a first end and a second end, the wall defining a longitudinal passageway from the first end to the second end, the tube assembly further comprising at least one inlet hole through the wall between the first and second ends, the inlet hole being connected to receive pressurized LPG fuel from the shut-off valve;

a seat secured at the second end of the tube assembly, the seat defining an opening;

an armature assembly disposed within the tube assembly, the armature assembly having a sealing member for sealing the seat opening when in contact with the seat;

a member biasing the armature assembly toward the seat; and a solenoid coil operable to displace the armature assembly with respect to the seat;

a vent line connecting the first end of the tube assembly to the shut-off valve for returning excess fuel vented axially through the tube assembly to the first end;

the second end of the tube assembly extending into the engine intake manifold for injecting pressurized fuel from the injector; and a controller electrically connected for actuating the solenoid coil to inject fuel into the intake manifold.

14. The system according to claim 13, wherein the LPG fuel injector further comprises:

an O-ring retaining cup including:

a cylindrical sleeve portion surrounding at least a portion of the tube assembly and having at least one inlet opening coincident with the at least one inlet hole of the tube assembly.

15. The system according to claim 14, wherein the O-ring retaining cup further includes:

a first circumferential weld connecting the cylindrical sleeve to the tube assembly on a first side of the at least one inlet opening; and a second circumferential weld connecting the cylindrical sleeve to the tube assembly on a second side of the at least one inlet opening.

16. The system according to claim 14, further comprising:

a fuel rail connected for receiving pressurized fuel from the shut-off valve and for delivering pressurized fuel to the injector; and wherein the O-ring retaining cup further includes:

first and second circumferential O-ring grooves on respective sides of the at least one inlet opening for sealing the injector to the fuel rail.

17. The system according to claim 13, wherein the at least one inlet hole comprises a plurality of inlet holes circumferentially spaced around the wall.

18. The system according to claim 13, wherein the fuel injector is oriented with the first end of the tube assembly higher than the second end.

19. The system according to claim 13, wherein the shut-off valve further comprises a regulator.

\* \* \* \* \*